April 27, 1937.  D. EISINGA  2,078,531
THERMOSTATIC SWITCH
Filed Nov. 14, 1934  2 Sheets-Sheet 1
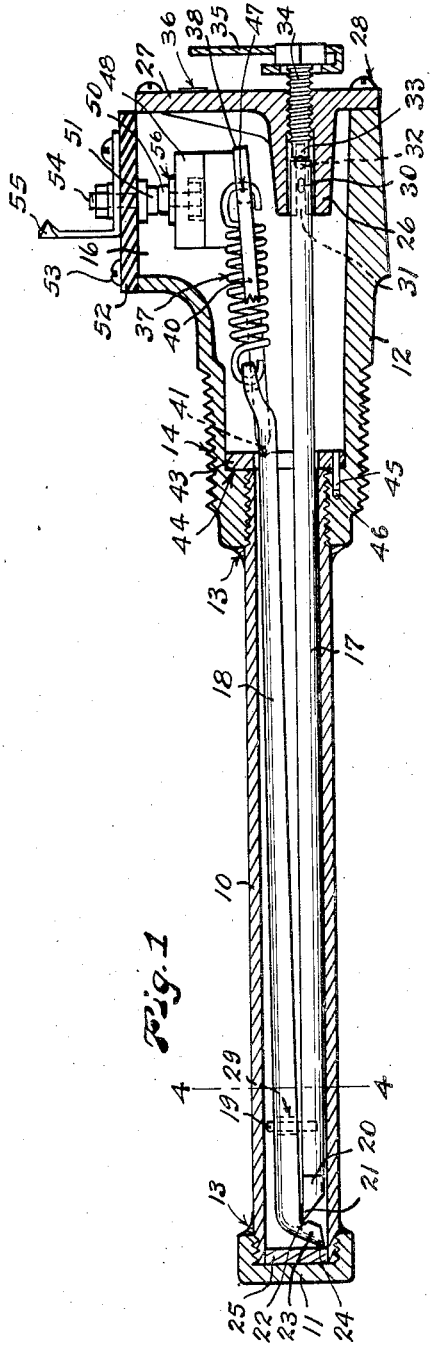
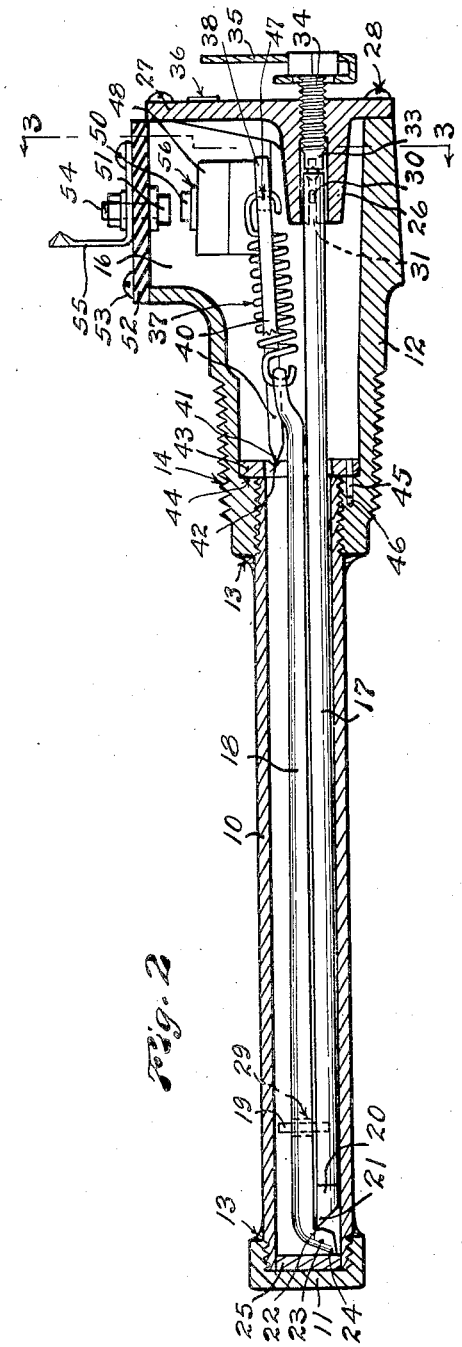
INVENTOR
Dirk Eisinga
BY Fred C. Matheny
ATTORNEY April 27, 1937.  D. EISINGA  2,078,531
THERMOSTATIC SWITCH
Filed Nov. 14, 1934    2 Sheets-Sheet 2
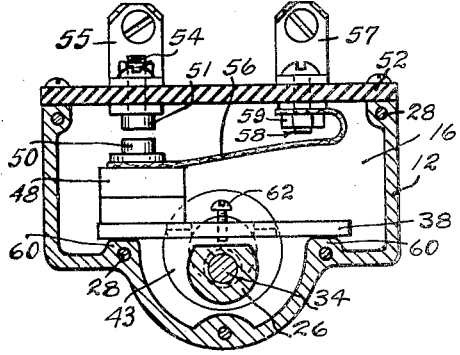
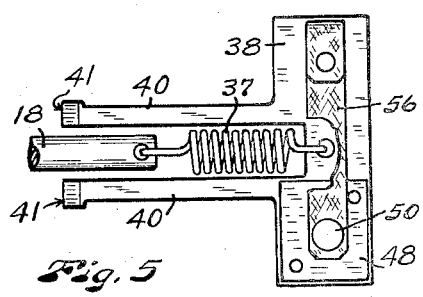
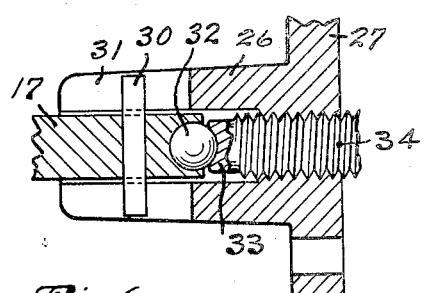
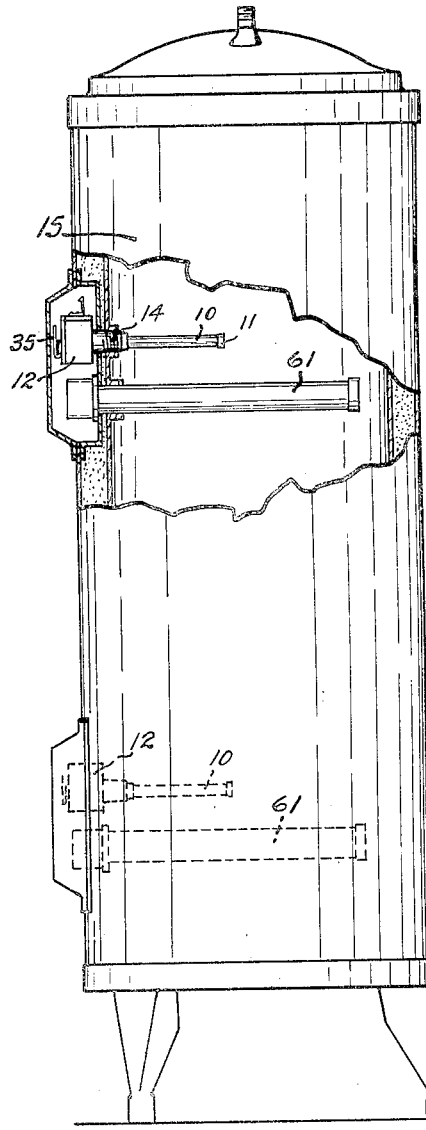
INVENTOR
Dirk Eisinga
BY Fred C. Matheny
ATTORNEY Patented Apr. 27, 1937

2,078,531

UNITED STATES PATENT OFFICE 2,078,531

THERMOSTATIC SWITCH

Dirk Eisinga, Glendale, Calif., assignor to National Steel Construction Co., Seattle, Wash., a corporation of Washington Application November 14, 1934, Serial No. 752,964

6 Claims. (Cl. 200—137)

My invention relates to thermostatic switches and the general object of my invention is to provide a thermostatic switch of simple and efficient construction which is especially well adapted for use in connection with liquid containers in which the thermostatic element may be immersed in the liquid.

An important object of the invention is to provide a thermostat embodying a tube of metal having a high coefficient of expansion, which tube serves as a thermostat element and at the same time serves as a housing for other thermostat mechanism including a metal rod having a low coefficient of expansion and adapted to co-operate with said metal tube.

Another important object of the invention is to provide a thermostat switch of this nature which is provided with simple and efficient quick make and quick break means for opening and closing the switch with a snappy movement.

A further object of the invention is to provide a thermostatic switch of this type in which all of the operating mechanism is readily removable from the housing in which it is contained without removing said housing from the liquid container or tank in which it is installed.

A still further object is to provide a thermostatic switch which employs a relatively strong tension spring for moving electrical contact members with a snappy movement back and forth between open switch and closed switch positions, and, in which the parts cooperating with this spring are arranged so that the deflection of said parts due to the tension of this spring is substantially negligible.

Another object is to provide a thermostatic switch employing a spring, as above set forth, in which the spring may be assembled with the levers and other parts while there is no tension on said spring and in which tension may be placed on said spring, after assembly, by the turning of an adjusting screw by which the thermostat is adjusted.

Another object of the invention is to provide a thermostatic switch in which the thermostat is readily adjustable to operate at various different temperatures.

When thermostatically controlled switches of this nature are installed in connection with hot water tanks they are difficult to remove from the tanks and require the draining of the tanks previous to their removal. My invention makes it unnecessary to remove the housing of the thermostatic switch from the tank for repair because all of the operating mechanism is accessible from the exterior without removing the thermostatic switch housing.

Other and more specific objects of the invention will be apparent from the following description taken in connection with the accompanying drawings.

In the drawings Fig. 1 is a longitudinal sectional view of a thermostatic switch constructed in accordance with my invention showing the same in closed switch position.

Fig. 2 is a similar view showing the switch in open position.

Fig. 3 is a cross sectional view substantially on broken line 3—3 of Fig. 2, parts being shown in elevation.

Fig. 4 is a sectional view substantially on broken line 4—4 of Fig. 1.

Fig. 5 is a detached plan view of a switch lever showing contact means, a spring and a fragment of a lever arm connected therewith.

Fig. 6 is a fragmentary sectional view on an enlarged scale of the end of a thrust rod and a cooperating adjusting screw.

Fig. 7 is an elevation, on a reduced scale, with parts broken away, illustrating an installation of this invention in connection with a hot liquid storage tank.

Like reference numerals designate like parts throughout the several views.

In the drawings 10 designates a tube formed of metal having a high coefficient of expansion. I prefer to make this tube of copper although obviously other metals or metal alloys may be used. The tube 10 is closed at one end as by a cap 11 and has its other end connected with a housing 12, preferably by threading the end of the tube into said housing. The threaded joints between the cap 11, tube 10 and housing 12 are preferably further sealed by externally soldering the same, as at 13, thus precluding any possibility of leakage of water or other liquid past these joints. The housing 12 is larger than the tube 10 to afford room for the installation of switch mechanism and said housing 12 is externally threaded, as at 14 so that it may be screwed into the side of a liquid container 15. The portion 16 of the housing in which the switch mechanism is contained may be of generally rectangular shape, as shown in Fig. 3.

The thermostatic mechanism which cooperates with the tube 10 in providing the movement for operating the electric switch is in the nature of a metal rod 17 having a low coefficient of expansion and a lever arm 18, cooperating with said rod 17 and with the tube 10, which has a high coefficient of expansion. The rod 17 has a hardened bearing member 20 on one end thereof. The bearing member 20 has a knife edge 21 which bears against a recessed and hardened seat 22 in an angular portion 23 of the end of the lever arm 18. The tip 24 of the angular portion 23 rests against a hardened bearing disc 25 which is supported by the cap 11. This provides a relatively short lever arm 23 between the tip 24 and bearing seat 22 and a relatively long lever arm from the bearing seat 22 to the other end of the lever 18. The rod 17 and lever 18 both extend throughout substantially the entire length of the tube 10 and have their rear end portions positioned in the housing 12. The forward end portions of the rod 17 and lever 18 are loosely connected together to prevent sidewise displacement thereof by a dowel pin 19 which is rigid with the bar 17 and fits loosely into a hole 29 in the lever 18. The pin 19 has a length only slightly less than the diameter of the tube 10 and serves as a means for preventing movement of the end portion of rod 17 transversely of the tube.

The end portion of the rod 17 which is positioned in the housing 12 fits slidably within a tubular boss 26 which is rigid with an end plate 27. The end plate 27 is removably secured to the end of the housing 12 as by screws 28. A flattened cross pin 30, in the end portion of the rod 27 which fits into the tubular boss 26, is positioned within longitudinal slots 31 in said tubular boss 26. This cross pin 30 serves as a guiding means for the rod 17 and prevents the same from turning. A hardened steel ball 32, see Fig. 6, is provided in the end of the rod 17 for engagement by a hardened concave bearing member 33 on the end of a screw 34 which is threaded into the tubular boss 26. The head of the screw 34 is positioned on the exterior of the end plate 27 and is provided with a rigidly connected cross arm 35 which serves both as a finger piece by which the screw may be turned and as a pointer for indicating the setting of said screw. The end plate 27 may have suitable spaced apart graduations 36 thereon, to which the cross arm 35 may be set. It will be apparent that a relatively slight longitudinal movement of rod 17 produced by turning of screw 34 will produce a much greater movement of the movable end portion of lever arm 18, which is positioned within housing 12, the screw 34 thus serving as a ready means for adjusting the switch to operate at different temperatures.

The end portion of the lever arm 18 which is positioned in the housing 12 is preferably offset upwardly for purposes of clearance and is connected with one end of a tension spring 37. The other end of the tension spring 37 is connected with a plate portion 38 of a switch lever. This switch lever has two spaced apart arms 40 between which the spring 37 is operatively disposed. The ends of the arms 40 remote from the plate 38 are provided with knife edge bearings 41 which seat within V shaped notches 42, see Fig. 2, in a washer 43. The washer 43 rests against a suitable shoulder 44 which is formed within the housing 12 at substantially the location of the end of the pipe 10 and said washer may also rest against the end of the pipe 10 as shown in Figs. 1 and 2. A dowel pin 45 in washer 43 is adapted to fit within a suitable hole 46 in the shoulder 44 to angularly position the washer 43 so that the V shaped notches 42 will be maintained in the correct location to receive and hold the knife edge bearings 41 of the switch lever.

The tension spring 37 exerts a pull on the plate 38. This places the arm members 40 under compression and presses the knife edges 41 against the washer 43. If the line of pull of the spring 37 coincides with the plane of the switch lever, that is, with the plane which passes through the fulcrum point 41—42 and through a point 47 from which the pull of the spring is exerted on the plate 38, then there will not be any tendency for the switch lever to pivot or swing in either direction. If the line of pull of the spring is shifted to either side of the above mentioned plane, then a component of the force exerted by the spring 37 will tend to angularly move the switch lever 38—40 in a direction toward the side of the plane of the switch lever to which the pull is exerted. It is thus apparent that by moving the end of the lever arm 18 to which the spring 37 is connected it is possible to shift the line of pull of the spring 37 to either side of the plane passing through points 47 and 41—42 and thus move the switch lever with a quick and snappy movement in either direction. The movable end of the lever arm 18 is moved by expansion and contraction of the tube 10.

As the pull of the spring 37 is exerted substantially longitudinally of the switch lever 40—38 and lever arm 18, at all times, and is not exerted directly on other levers or parts, the tendency of said spring to deflect parts is substantially negligible.

A support 48 of insulating material mounted on the switch plate 38 carries an electrical contact member 50. This contact member 50 projects above the support 48 and is adapted to make electrical contact with another contact member 51 which is carried by a cover plate 52 of insulating material. The cover plate 52 is secured to the housing 12 as by screws 53, and also serves as a closure member for the top of said housing. The contact member 51 has a binding post portion 54 which extends upwardly through the cover plate 52 and is electrically connected with a terminal clip 55 to which any suitable circuit wire may be electrically connected. A flexible electrical conductor member 56, see Fig. 3, connects the contact member 50 with another terminal clip 57 on the cover plate 52, thus affording means for closing an electrical circuit between terminal clips 55 and 57 when electrical contact members 50 and 51 are in electrical contact with each other. As conductor member 56 is very flexible and of substantial length it will not retard or hamper the free movement of the switch lever. A bolt 58 and nut 59 may be used to connect conductor member 56 with terminal clip 57 as shown in Fig. 3.

The amount of angular movement of the switch lever in the direction required to close the switch is limited by engagement of the two contact members 50 and 51, while angular movement of said switch lever in the direction required to open the switch may be limited by engagement of the plate member 38 with two shelf like portions 60 of the housing 12, or may be limited by engagement of an adjustable screw 62 in the plate 38 with the top of the boss 26, said screw affording a means of adjusting the throw of the switch lever in one direction.

In dis-assembling this device the screw 34 is first retracted far enough to relieve tension on the spring 37. The end plate 27 is then removed carrying the screw 34 with it and leaving the rod 17 and all of the other parts in the tube 10 and housing 12. The nut 59 which secures the flexible conductor to the terminal clip 57 is then removed leaving said flexible conductor free and unattached as respects the housing. The rod 17, lever 18 and switch plate 38, together with all of the parts attached thereto may then be freely withdrawn from the tube 10 and housing 12.

In assembling the device the rod 17, lever 18, switch plate 38 and parts connected therewith including the spring 37 are first connected together in the proper way and are then inserted in the housing 12 and tube 10. The nut 59 is then placed on the bolt 58 to electrically connect the flexible conductor to the terminal clip 57. After this has been done the several parts will all be in their proper relation but the spring 37 will not be under tension and the tip 24 of the lever 18 will not be pressed against the disc 25. The end plate 27 is then put in place and secured to the housing 12 with the adjusting screw 34 retracted. This screw 34 is then screwed inwardly forcing the rod 17 toward the capped end of the tube 10 and placing the spring 37 under tension. After the tip 24 of the portion 23 of lever arm 18 has engaged the disc 25 the rear end of said lever arm will be moved upwardly into a position as shown in Fig. 1, and the switch contact 50 will be snapped from an open to a closed position as respects switch contact 51. The finger piece 35 may then be set, by reference to the graduations 36 so that the switch will operate at approximately the desired temperature, and this adjustment may be varied, after observing the actual operation of the device, to secure opening and closing of the switch at the exact temperatures desired. This thermostatic switch may be installed in the side of a liquid container 15 in close proximity to an electric fluid heater 61 as indicated in Fig. 7, and adjusted to operate at any desired temperatures. When the temperature of the fluid surrounding the tube 10 is below the predetermined minimum, at which the thermostat is adjusted to operate, the longitudinal contraction of the tube 10 will press the disc 25 against the tip of the lever arm 18 hard enough to angularly move said lever arm 18 about the fulcrum formed by knife edge 21 thus moving the rear end of said lever arm 18 away from the rod 17. This shifts the line of pull of the spring above the plane of the switch lever 38—40 and causes the contact member 50 to be moved into electrical engagement with the contact member 51 thus closing an electrical circuit to the fluid heater 62 and putting said heater into operation. As the temperature of the liquid in the tank surrounding the thermostat tube 10 increases the tube 10 will expand longitudinally while the length of the rod 17 will remain substantially constant. This will allow the free end of the lever arm 18 to move downwardly by gravity and when the line of pull of the spring 37 has moved below a line which passes through the points 41 and 47 the switch will be snapped to open position and the circuit controlled by said switch broken. The breaking of this circuit with a quick snappy movement prevents damage to contact members 50 and 51 by arcing. The thermostat is always installed with the tube 10 in a generally horizontal position and the lever 18 above the rod 17. The end portion of the lever 18 is heavy enough so that it will always tend to drop by gravity into the open switch position shown in Fig. 2 unless it is urged into an elevated position as shown in Fig. 2, by pressure exerted at the locations 21 and 22 on the shorter arm 23 of said lever 18.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a thermostatic apparatus, a tube; a rod member disposed longitudinally within said tube, said rod member having a lower coefficient of expansion than said tube; a housing rigid with one end portion of said tube; means rigid relative to said housing supporting one end of said rod member; movable lever means positioned longitudinally within said tube having one end extending into said housing; a relatively short rigid inclined arm member on the end of said lever means remote from said housing; a knife edge bearing on the outer end of said rod engaging said short arm member adjacent the junction of the same with said lever means; means rigid with the outer end portion of said tube engaging the end of said short lever arm member; and circuit opening and closing means positioned in said housing operatively connected with the end portion of said lever means.

2. In a thermostatic apparatus, a tube; a rod member disposed longitudinally within said tube, said rod member having a lower coefficient of expansion than said tube; a housing rigid with one end portion of said tube; an adjusting screw threaded in said housing operable from the exterior of the housing and providing an adjustable thrust support for one end of said rod; movable lever means positioned longitudinally within said tube having one end extending into said housing; a relatively short rigid inclined arm member on the end of said lever means remote from said housing; a knife edge bearing on the outer end of said rod engaging said short arm member adjacent the junction of the same with said lever means; means rigid with the outer end portion of said tube engaging the end of said short lever arm member; and circuit opening and closing means positioned in said housing operatively connected with the end of said lever means.

3. In thermostatic apparatus, a tube having one closed end; a housing rigidly secured to the other end of said tube; a rod member disposed longitudinally within said tube and extending into said housing, said rod member having a different coefficient of expansion than said tube; adjustable means rigid relative to said housing providing a thrust support for one end of said rod member; a movable lever member extending lengthwise within said tube, said lever having means positioned between the end of said rod and the closed end of said tube for moving said lever in response to relative differences in the lengths of said tube and said rod produced by variations of temperature; a switch lever positioned in prolongation of said lever member and fulcrumed adjacent the end of said lever member; a tension spring connecting the movable end portion of said lever member with the movable end portion of said switch lever, the end of said lever member which is connected with said spring being movable back and forth across a straight line which passes through the fulcrum of said switch lever and the point of connection of said spring with said switch lever, whereby said switch lever will be moved back and forth with a quick movement; and circuit opening and closing means carried by said switch lever.

4. In thermostatic apparatus, a tube having one closed end; a housing rigidly secured to the other end of said tube; a rod member disposed longitudinally within said tube and extending into said housing, said rod member having a different coefficient of expansion than said tube; adjustable screw means in said housing providing a thrust support for one end of said rod; movable lever means positioned longitudinally within said tube having one end extending into said housing; a relatively short rigid inclined arm member on the end of said lever means remote from said housing; a knife edge bearing on the outer end of said rod engaging said short arm member adjacent the junction of the same with said lever means; means rigid with the closed outer end portion of said tube engaging the end of said short lever arm member; a switch lever positioned in prolongation of said lever member and fulcrumed adjacent the end of said lever member; a tension spring connecting the movable end portion of said lever member with the movable end portion of said switch lever, the end of said lever member which is connected with said spring being movable back and forth across a straight line which passes through the fulcrum of said switch lever and the point of connection of said spring with said switch lever, whereby said switch lever will be moved back and forth with a quick movement, said adjusting screw supporting the end of said rod member serving to place said spring under tension after said thermostat mechanism is assembled; and circuit opening and closing means carried by said switch lever.

5. In thermostatic apparatus, a tube; a housing rigidly connected with one end of said tube; a tubular boss in said housing having guide means therein; a rod extending lengthwise of said tube and into said housing, the end portion of said rod being positioned in said tubular boss; cross pin means in the rod operable in said guide means supporting said rod against rotation; a lever arm positioned lengthwise within said tube above said rod; dowel pin means loosely connecting said rod and said lever arm; a relatively short inclined arm member on the end of said lever remote from said housing; a knife edge bearing member on the outer end of said rod engaging said short arm member adjacent the junction of the same with said lever arm; and means rigid with the outer end portion of said tube engaging the end of said short lever arm, said rod and said tube having unequal coefficients of expansion whereby said lever arm may be moved by reaction of said rod and said tube in response to changes of temperature.

6. In thermostatic apparatus, a tube having one end closed and adapted to be immersed in fluid of variable temperature; a housing rigidly secured to the other end of said tube; a shoulder provided in said housing adjacent the end of said tube; a rod member disposed longitudinally within said tube and extending into said housing, said rod member having a different coefficient of expansion than said tube; a removable end plate on said housing; a tubular boss on the inner side of said end plate receiving the end of said rod; guide slots extending lengthwise of said boss; a cross pin in said rod guided in said guide slots; an adjusting screw threaded into said tubular boss providing a thrust support for the end of said rod; a pointer member on the outer end of said adjusting screw; a movable lever member extending lengthwise in said tube and positioned above said rod; a relatively short rigid inclined arm on the outer end of said lever member; a knife edge bearing member on the outer end of said rod engaging said short arm adjacent the junction of the same with said lever member; means rigid with the closed outer end portion of said tube engaging the end of said short lever arm, whereby said lever arm will be angularly moved in response to differences in the relative lengths of said rod and said tube produced by changes of temperature; a switch lever positioned in said housing in approximate alignment with said lever arm, said switch lever having spaced apart arms fulcrumed on said shoulder of said housing adjacent the end of said tube; a tension spring positioned between said spaced apart arms of said switch lever and connecting said switch lever with said lever arm; and circuit opening and closing means carried by said switch arm.

DIRK EISINGA.